Nov. 26, 1968       R. J. FRANZ       3,412,649
MULTI-POSITION VACUUM MOTOR
Filed Aug. 5, 1966                    2 Sheets-Sheet 1
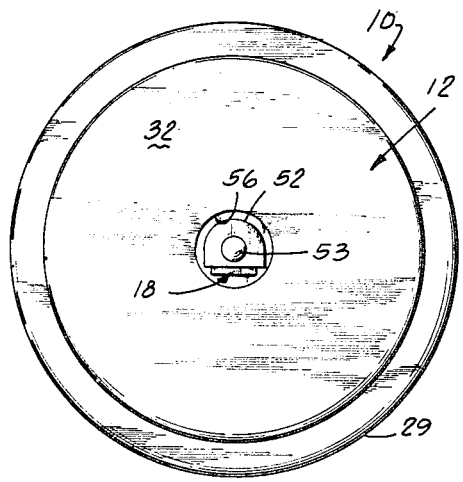
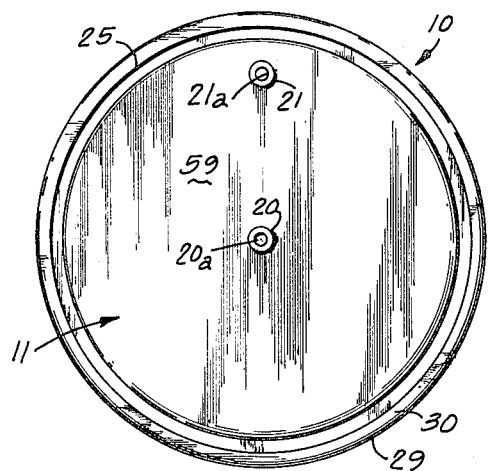
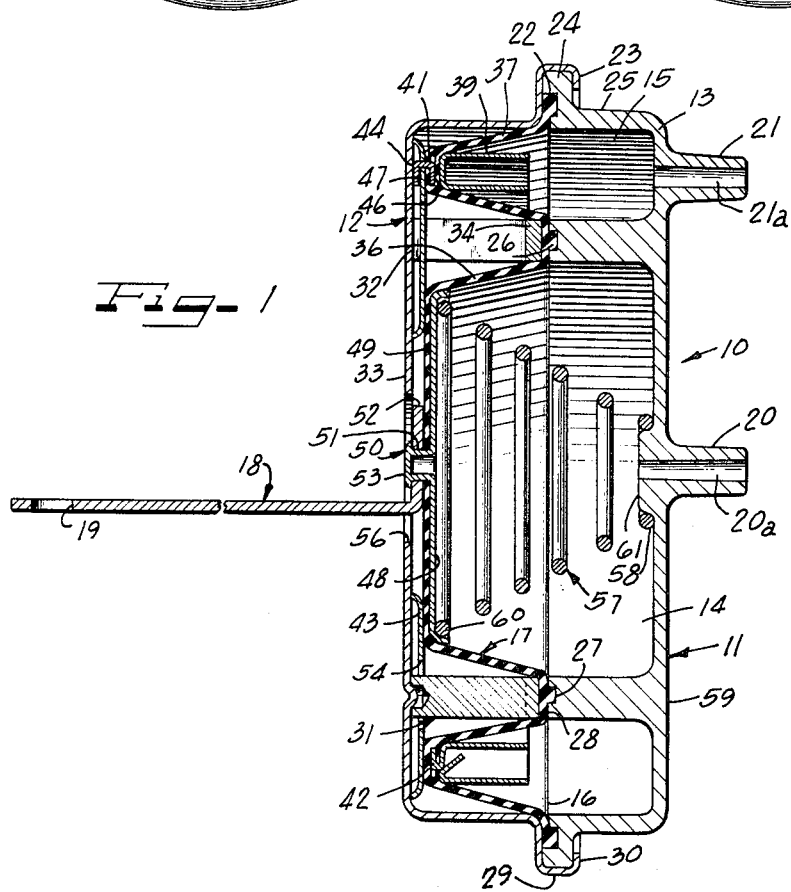
INVENTOR.
RUDOLPH J. FRANZ
BY Hill, Sherman, Meroni, Gross & Simpson ATTORNEYS

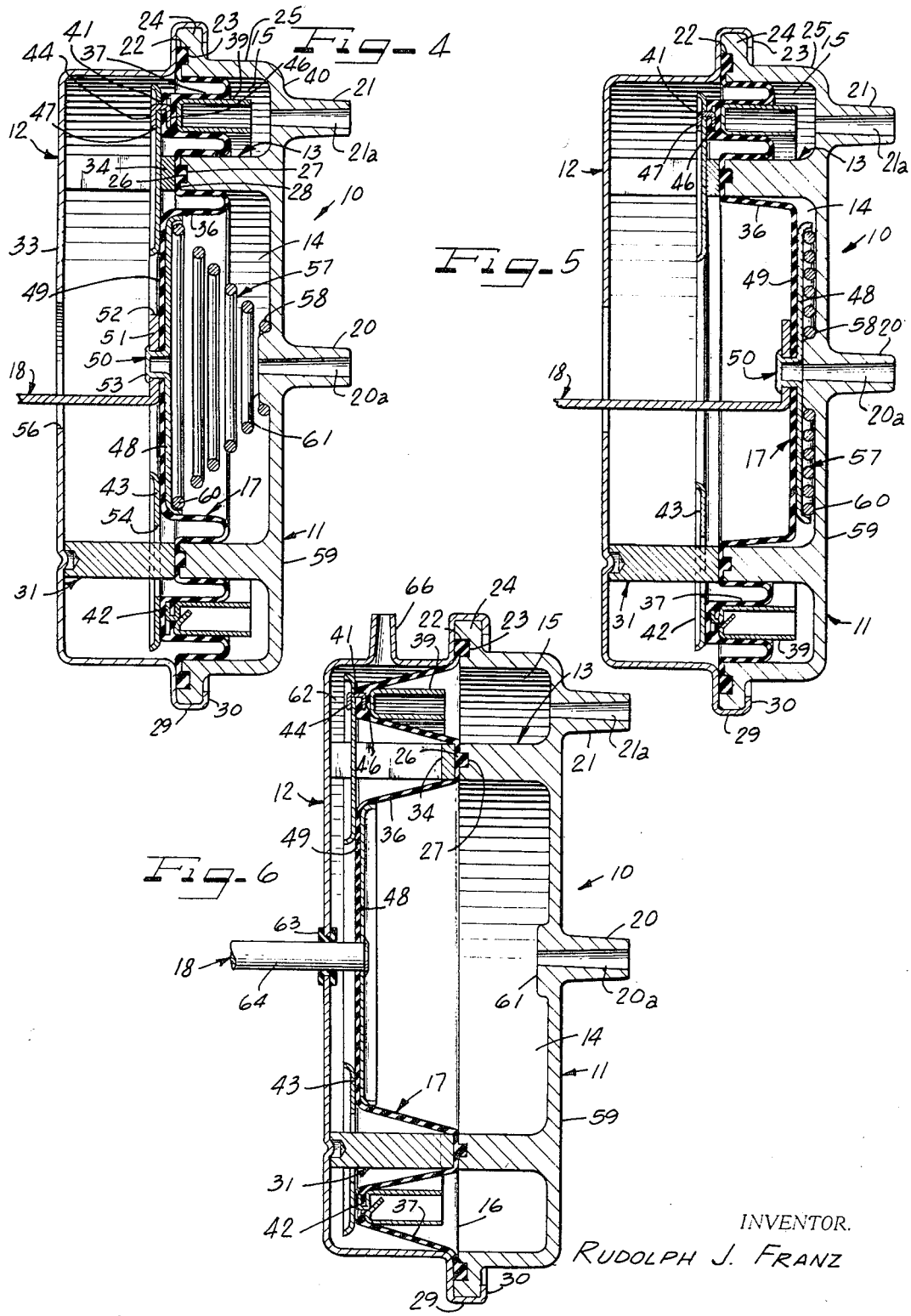

United States Patent Office 3,412,649
Patented Nov. 26, 1968

3,412,649
MULTI-POSITION VACUUM MOTOR
Rudolph J. Franz, Arlington Heights, Ill., assignor to
The Dole Valve Company, Morton Grove, Ill., a corporation of Illinois
Filed Aug. 5, 1966, Ser. No. 570,524
6 Claims. (Cl. 92—48)

ABSTRACT OF THE DISCLOSURE

A multi-position vacuum motor in which a pair of vacuum chambers are arranged in concentric relation within a cylindrical housing. A single flexible diaphragm extends across and closes adjacent open ends of each of the chambers and a pair of rigid disc members are affixed to the diaphragm on the portions thereof closing the chambers. The disc members are arranged in overlapping relation in a radial direction for movement into abutting engagement with one another and a work-output member is affixed to one of the disc members. A spring biases the disc members toward one another and vacuum connections communicate respectively with the vacuum chambers to independently vary the pressures within the chamber to provide multiple positioning of the working member.

---

This invention relates generally to pressurized fluid operated motor mechanisms and more particularly to a motor having plural pressure chambers and a working member movable to multiple pre-selected positions in response to pressure variations within the respective chambers.

According to the principles of this invention, a series of pressure chambers are arranged in substantially side-by-side relation and each is equipped with a wall member such as a diaphragm in communiaction with the chamber and movable in opposite directions in response to pressure variations within the chamber. The directions of travel of the movable wall members are parallel to each other and each wall member can move between two limiting positions, although the limiting positions of all of the movable wall members at one end of their directions of travel reside in different planes transverse to the directions of travel.

A rigid flange or the like operating member is fixedly connected to each wall member to move therewith and the operating members overlap each other in the parallel directions of travel such that when the one movable wall member having a limiting position farthest in one direction of movement is urged by a variation in pressure within its respective chamber, along with its operating member, to its limiting position in the opposite direction of movement, all of the other operating members are also moved to the limiting position of said one movable wall member in the opposite direction of movement.

The motor of this invention is, of course, intended to actuate or operate an associated mechanism or apparatus and for this purpose a working member adapted to be connected to the associated device is connected in fixed assembly to the operating member and the movable wall member having a limiting position least farthest in said one direction of movement. Thus, by suitably varying the pressures in the respective chambers sequentially, the working member can be moved to the multiple positions corresponding to the limiting positions of the movable wall members in said opposite direction of movement.

Additional working members can, of course, be connected to intermediate operating members although limited in the number of pre-selected positions to which they are movable depending upon the relative position of their corresponding movable wall members in said series.

One of the features of the present invention resides in the concentric arrangement of the pressure chambers which are themselves annularly shaped. The invention also features a unitary flexible wall member such as a diaphragm having radially spaced integral portions respectively overlying and providing the movable wall members for the respective pressure chambers and intermediate integral portions disposed in sealing relation to partition walls separating the concentric pressure chambers whereby multiple movable wall members are provided by a single diaphragm.

The operating members comprise rigid annular discs or the like also concentrically arranged and in overlapping relation for abutting engagement when the movable wall members are urged in said opposite direction of movement. Means are provided for moving the working member in said one direction when the pressure in the chambers is relieved. Two embodiments of such means are illustrated in the drawing, one of which comprises a biasing member and the other of which comprises an additional pressure chamber.

Thusly arranged, the present invention is simply constructed, inexpensive in manufacture, compact in size, requires few moving parts, is adaptable to provide any number of pre-selected positions of the working member and can serve a long-useful life.

It is, therefore, an object of the present invention to provide an improved pressure fluid operated motor having plural pressure chambers and a working member movable to multiple pre-selected positions in response to pressure variations within the respective chambers.

Another object of the invention is to provide a motor of the type described wherein only one positive or negative pressure need be utilized to move the working member to all of its pre-selected positions.

Another object of the invention is to provide simplicity in construction and physical compactness by arranging a series of annularly shaped pressure chambers in concentric relation.

A further object of the invention is to provide a single diaphragm or the like capable of serving as a plurality of independently movable wall members for the pressure chambers.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example.

On the drawings:

FIGURE 1 is a vertical sectional view of an exemplary pressurized fluid operated motor constructed in accordance with the principles of the present invention and showing a working member thereof in one of plural pre-selected positions to which it is movable;

FIGURES 2 and 3 are front and back vertical elevational views of the motor shown in FIGURE 1;

FIGURES 4 and 5 are similar to FIGURE 1 but illustrated the working member disposed in different pre-selected positions; and FIGURE 6 is another embodiment of the invention which comprises an additional pressure chamber for returning the working member to the position thereof shown in FIGURE 1.

As shown in the drawings:

Although the principles of the present invention are applicable whether the operating fluid is of a positive or negative pressure, for convenience the illustrated embodiment will be described as being operated by fluid at a pressure of less than atmospheric, that is, a vacuum. The term "vacuum motor" will be used from time to time herein to designate the invention but it will be appreciated that the motor can also be advantageously utilized when the pressure of the operating fluid is above atmospheric.

Referring to FIGURES 1-3, the multi-position vacuum motor of the present invention is indicated generally at reference numeral 10 and comprises a cylindrically shaped housing 11 and a housing cover or end cap 12. An annularly shaped partition wall 13 is formed within the housing 11 to divide the interior of the housing into inner and outer concentric chambers 14 and 15.

An open end 16 of the housing 11 is covered by a resilient member such as a diaphragm indicated at 17, concentric portions of which are in communication with the chambers 14 and 15, and the movable working member of the vacuum motor 10 which is adapted to actuate or operate an associate device or apparatus is indicated generally at reference numeral 18. Suitable means such as an aperture 19 may be provided to facilitate connection of the working member 18 to the device which it controls or operates.

In order to provide a vacuum condition in each of the chambers 14 and 15, the housing 11 comprises a pair of hose or similar conduit connections drilled as at 20a and 21a for connection to a vacuum pump or other source of sub-atmospheric fluid. It will be understood that when the terms "vacuum" and "sub-atmospheric" are used herein, it is meant a pressure level within the chambers 14 and 15 which is less than the pressure external thereof and on the opposite side of the diaphragm 17, since it is merely a differential in pressure across the diaphragm which is required for operation of the motor 10 as will be understood by those skilled in the art.

The resilient diaphragm 17 is circularly shaped in plan view and comprises a peripheral bead 22 fitted into a groove 23 formed in a radial peripheral flange 24 of a cylindrical side wall 25 of the housing 11. Another bead or ridge 26 is formed on the diaphragm 17 in concentric relation with the bead 22 and fits into an annularly shaped groove 27 opening to an end wall 28 of the cylindrical partition wall 13.

The peripheral bead 22 is maintained in tight sealing relation in the groove 23 by means of a flange 29 at the periphery of the end cap 12 and having an inturned lip 30 wrapped around the housing flange 24. Similarly, the bead 26 is pressed snugly into the groove 27 by means of a zig-zag garter-type spring 31 bottomed at one end 32 against a radial end wall 33 of the cap 12 and bottomed at an opposite end 33 against that portion of the diaphragm 17 which overlies wall 28 of the partition wall 13.

In the two-chamber embodiment of the motor 10 illustrated in the drawings, a central portion 36 of the diaphragm 17 moves axially in response to pressure variations in the chamber 14 and a peripheral portion 37 moves independently of portion 36 and in response to pressure variations in the chamber 15. A rigid annularly shaped back-up ring 39 which is U-shaped in cross section is disposed on the chamber side of the diaphragm portion 37 with the bight end thereof bottomed against a radial portion 41 of the diaphragm.

The ring 39 is connected in fixed assembly to the diaphragm 17 by means of a plurality of circumferentially spaced U-shaped ears 42 formed along the bight end of the ring 39 and embedded in the flat portion 41 of the diaphragm 17. On the opposite side of the flat portion 41 a radially extending annular disc-shaped flange or operating member 43 is connected to the flat portion 41 by means of a plurality of U-shaped ears 44, one radial leg 46 of each of which is embedded in the flat portion 41 of the diaphragm and another leg 47 of each of which overlies the disc 43 and clamps the disc to the flat portion 14 of the diaphragm, and through the diaphragm to the back-up ring 39 for joined assembly therebetween.

Another disc or operating member 48 is disposed on the chamber side of the diaphragm portion 36 and is pressed in fixed assembly against a flat radial portion 49 of the diaphragm by means of an axially extending rivet-like boss 50 which has a shank 51 protruding through apertures formed in the diaphragm as well as an inturned flange 52 of the working member 18 and an enlarged head 53 which maintains the operating member 48, the flat portion 49 of the diaphragm and the working member 18 in joined assembly.

The disc 43 comprises cutouts 54 which receive the ends 32 of the spring 31 to permit axial movement of the disc 43 over the stationary spring, and the end cap 12 has a cutout 56 through which the working member 18 extends.

A portion of the disc 43 overlies a peripheral portion of the disc 48 such that, as viewed in FIGURE 1, rightward movement of the disc 43 will move the disc 48 rightwardly also. Conversely, leftward movement of the disc 48 will cause leftward movement of the disc 43.

Means are provided for moving the disc 48, and therefore the working member 18, as far leftwardly as possible, which position may be considered a limiting position thereof. In the embodiment shown in FIGURE 1, a volute spring 57 is situated within the chamber 14 and has one end 58 bottomed against an end closure wall 59 of the housing 11 and an opposite end 60 bottomed against the disc or operating member 48. In view of the vacuum operating condition of the illustrated embodiment, the spring 57 is adapted to constantly bias member 48 to an open or spread position such as the limiting position shown in FIGURE 1. A raised boss 61 formed on the inner surface of the closure wall 59 centers the last coil at the spring end 58.

Operation of the motor 10 may be described by assuming that the limiting position of the working member 18 shown in FIGURE 1 obtains when the chambers 14 and 15 are maintained at atmospheric pressure similarly to the pressure on the opposite side of the diaphragm 17. The biasing effect of the spring 17 is, of course, the instrument which maintains the working member 18 in the position shown in FIGURE 1, which may be considered one of the pre-selected positions of the working member.

In FIGURE 4 is shown the relative disposition of parts when a vacuum is applied to chamber 15 only. The peripheral portion 37 of the diaphragm 17 has collapsed, and the disc 43 has moved axially rightwardly into abutting engagement with the inner end 34 of the spring 31. The working member 18 has moved correspondingly to a second pre-selected position thereof since the disc 43 has moved the inner disc 48 also rightwardly, partially collapsing the central portion 36 of the diaphragm 17 as well as the spring 57.

FIGURE 5 illustrates another limiting position of the working member 18 when the chamber 14 has also been subjected to a vacuum condition. The central portion 36 of the diaphragm 17 is completely collapsed as is the spring 57 and the disc or operating member 48 has bottomed on the boss 61 of the housing end wall 59.

Thus, the limiting position of the working member 18 in its path of travel shown in FIGURE 1 obtains when both chambers 14 and 15 are vented. The intermediate position of the working member 18 shown in FIGURE 4 obtains when a vacuum is applied to chamber 15 but chamber 14 is still vented, and the position shown in FIGURE 5 obtains when a vacuum is applied to both chambers 14 and 15. If chamber 14 is then vented, the working member 18 will return to the position thereof shown in FIGURE 4, and if both chambers are vented, the spring 57 will return the working member to the position thereof shown in FIGURE 1.

In the embodiment shown in FIGURE 6, the working member 18 is returned to the limiting position thereof shown in FIGURE 1 as a result of the application of a vacuum to another chamber 62 formed between the diaphragm 17 and the end cap 12 which has been equipped with an apertured fluid-tight seal 63 which receives a cylindrical shank 64 of the working member.

In the FIGURE 6 embodiment, the working member 64 is maintained in the limiting position shown therein when a vacuum is applied to the chamber 62 through a suitable connector 66, and chambers 14 and 15 are vented. The position of the working member corresponding to that shown in FIGURE 4 obtains when a vacuum is applied to chamber 14 and chambers 15 and 62 are vented. The position corresponding to FIGURE 5 obtains when a vacuum is applied to chambers 14 and 15 and chamber 62 is vented.

Because of the concentric arrangement of the vacuum chambers, it will be appreciated that the housing 11 can be easily partitioned to provide additional vacuum chambers and a corresponding increase in the number of preselected positions to which the working member can be moved. For example, by increasing the diameter of the housing 11 to form additional vacuum chambers radially of chamber 15 and by correspondingly increasing the diameter of the diaphragm 17 and adding additional operating members similar to the discs 43 and 48 additional intermediate positions of the working member between the limiting positions thereof shown in FIGURES 1 and 4 may be accommodated.

I claim as my invention:

1. A multi-position vacuum motor comprising
    an axially elongated housing having rigid wall means forming therewithin a pair of vacuum chambers spaced from each other and having axially open ends adjacent one another in a direction normal to the axis of the housing,
    movable wall means including a pair of movable wall sections respectively continuously sealingly closing the open ends of both of said vacuum chambers,
    a pair of rigid disc members respectively mounted in fixed assembly on said movable wall sections and overlapping one another in a direction normal to the axis of said housing for movement into abutting engagement with one another,
    a working member affixed to one of said disc members,
    means for biasing said one disc member axially into abutment with the other, and
    means for independently varying the pressures in said vacuum chambers.

2. The vacuum motor as defined in claim 1 wherein said movable wall means comprises a single flexible diaphragm inclosing the open ends of both of said vacuum chambers and affixed to said rigid wall means to provide an air seal between said chambers.

3. The vacuum motor as defined in claim 1 wherein said chambers are cylindrically shaped and concentric with one another and wherein one of said chambers is arranged in surrounding relation to the other about the axis of said housing.

4. A three-position vacuum motor comprising
    a housing having a cylindrical side wall and an end wall closing one end of said housing,
    an annular partition wall extending axially in concentric relation from said end wall,
    a circular flexible diaphragm overlying the open end of said housing,
    means clamping the edges of said diaphragm to said side wall and that portion of the diaphragm overlying said partition wall to said partition wall to form a pair of concentric pressure chambers and first and second movable wall members enclosing said chambers,
    independent means extending through said housing and communicating with said chambers for independently varying the pressure within said chambers,
    a first rigid disc member connected to said first wall member and movable therewith,
    a working member connected to said first disc member and movable therewith, and
    a second rigid disc member connected to said second wall member and movable therewith,
        said second disc member overlying said first disc member and abuttingly engageable therewith.

5. The vacuum motor as defined in claim 4 wherein said wall members are movable in opposite directions and including
    means in said first chamber constantly biasing said first wall member in one of said opposite directions.

6. The vacuum motor as defined in claim 4 wherein said housing comprises
    an end cap forming a third pressure chamber in communication with said diaphragm on the side thereof opposite said first and second chambers, and including additional independent means extending through said housing and in communication with said third chamber for independently varying the pressure therewithin.

References Cited

UNITED STATES PATENTS

| | | | |
|---|---|---|---|
| 2,197,075 | 4/1940 | Fitzgerald | 92—65 X |
| 2,465,714 | 3/1949 | Elliott | 92—49 |
| 2,495,369 | 1/1950 | Elliott | 92—99 |
| 2,495,869 | 1/1950 | Schroeder | 92—151 X |
| 2,641,986 | 6/1953 | Arthur | 92—105 X |
| 2,936,785 | 5/1960 | Hastings | 92—49 |
| 2,969,776 | 1/1961 | Riester | 92—48 |
| 3,077,186 | 2/1963 | De Beaubien et al. | 92—48 |
| 3,125,001 | 3/1964 | Cripe | 92—101 X |
| 3,187,640 | 6/1965 | Young et al. | 92—48 |
| 3,199,412 | 8/1965 | Palmer | 92—99 X |
| 3,312,313 | 4/1967 | Moyer | 92—61 X |

FOREIGN PATENTS

| | | |
|---|---|---|
| 999,277 | 10/1951 | France. |
| 319,349 | 3/1957 | Switzerland. |

MARTIN P. SCHWADRON, *Primary Examiner.*

I. C. COHEN, *Assistant Examiner.*